US010114708B2

(12) United States Patent
Goodman et al.

(10) Patent No.: US 10,114,708 B2
(45) Date of Patent: Oct. 30, 2018

(54) AUTOMATIC LOG COLLECTION FOR AN AUTOMATED DATA STORAGE LIBRARY

(71) Applicant: INTERNATIONAL BUSINESS MACHINES CORPORATION, Armonk, NY (US)

(72) Inventors: Brian G. Goodman, Tucson, AZ (US); Jose G. Miranda Gavillan, Tucson, AZ (US); Kenny N. G. Qiu, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 53 days.

(21) Appl. No.: 15/252,557

(22) Filed: Aug. 31, 2016

(65) Prior Publication Data
US 2018/0060191 A1 Mar. 1, 2018

(51) Int. Cl.
G06F 11/00 (2006.01)
G06F 11/14 (2006.01)
G06F 3/06 (2006.01)

(52) U.S. Cl.
CPC .......... *G06F 11/1471* (2013.01); *G06F 3/065* (2013.01); *G06F 3/0619* (2013.01); *G06F 3/0683* (2013.01); *G06F 2201/805* (2013.01); *G06F 2201/84* (2013.01)

(58) Field of Classification Search
USPC .......................................................... 714/19
See application file for complete search history.

(56) References Cited

U.S. PATENT DOCUMENTS

| 5,212,784 | A | 5/1993 | Sparks |
| 6,625,703 | B2 | 9/2003 | Goodman et al. |
| 7,287,133 | B2 | 10/2007 | Rowan et al. |
| 7,418,635 | B2 | 8/2008 | Schulstad |
| 8,549,327 | B2 | 10/2013 | Mayer et al. |
| 2005/0160325 | A1* | 7/2005 | Ogino .............. G08B 13/19645 714/47.1 |
| 2007/0283192 | A1* | 12/2007 | Shevchenko ......... G06F 21/554 714/39 |
| 2008/0086515 | A1 | 4/2008 | Bai et al. |
| 2011/0246426 | A1 | 10/2011 | Cho |
| 2012/0089572 | A1 | 4/2012 | Raichstein et al. |
| 2012/0179816 | A1* | 7/2012 | Malloy .................. H04L 43/00 709/224 |
| 2013/0227350 | A1 | 8/2013 | O'Riordan et al. |
| 2014/0089264 | A1 | 3/2014 | Talagala et al. |
| 2015/0074458 | A1 | 3/2015 | Atluri et al. |

(Continued)

OTHER PUBLICATIONS

List of IBM Patents or Patent Applications Treated as Related dated Sep. 1, 2016 (2 pages).

*Primary Examiner* — Sarai E Butler
(74) *Attorney, Agent, or Firm* — Griffiths & Seaton PLLC

(57) ABSTRACT

Embodiments for automatic log collection of an automated data storage library by a processor. An occurrence of a triggering event associated with an automated data storage library is detected. The triggering event may include at least detecting an opening of one or more doors of the automated data storage library. A snapshot of one or more logs is captured in the automated data storage library upon detection of the triggering event. The snapshot of the one or more logs in the automated data storage library is stored.

20 Claims, 11 Drawing Sheets

(56) References Cited

U.S. PATENT DOCUMENTS

2015/0113312 A1* 4/2015 Velayudhan ........ G06F 11/2092
714/4.11
2016/0117228 A1* 4/2016 Farlee ................. G06F 11/1469
714/19

* cited by examiner

US 10,114,708 B2

AUTOMATIC LOG COLLECTION FOR AN AUTOMATED DATA STORAGE LIBRARY

BACKGROUND OF THE INVENTION

Field of the Invention

The present invention relates in general to computing systems, and more particularly to, various embodiments for automatic log collection for an automated data storage library using a computing processor.

Description of the Related Art

Data storage libraries provide a means of storing large amounts of data for host computer systems. Automated data storage libraries are known for providing cost effective storage and retrieval of large quantities of data, typically from data storage cartridges stored in storage slots of the library. The libraries typically comprise large numbers of data storage media that are stored in storage shelves, numbers of data storage drives to read and write data with respect to the data storage media, one or more robot accessors to access the data storage media to move the data storage media between the storage shelves and data storage drives, and control units to control the operation of the library and control the flow of data and information between the library and host computer systems. The data storage cartridges are typically extracted from the storage slots, placed in the storage slots, and transported within the library by one or more accessors.

SUMMARY OF THE INVENTION

Various embodiments for automatic log collection of an automated data storage library by a processor, are provided. In one embodiment, by way of example only, a method for automatic log collection for an automated data storage library, again by a processor, is provided. An occurrence of a triggering event associated with an automated data storage library is detected. The triggering event may include at least detecting an opening of one or more doors of the automated data storage library. A snapshot of one or more logs is captured in the automated data storage library upon detection of the triggering event. The snapshot of the one or more logs in the automated data storage library is stored.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
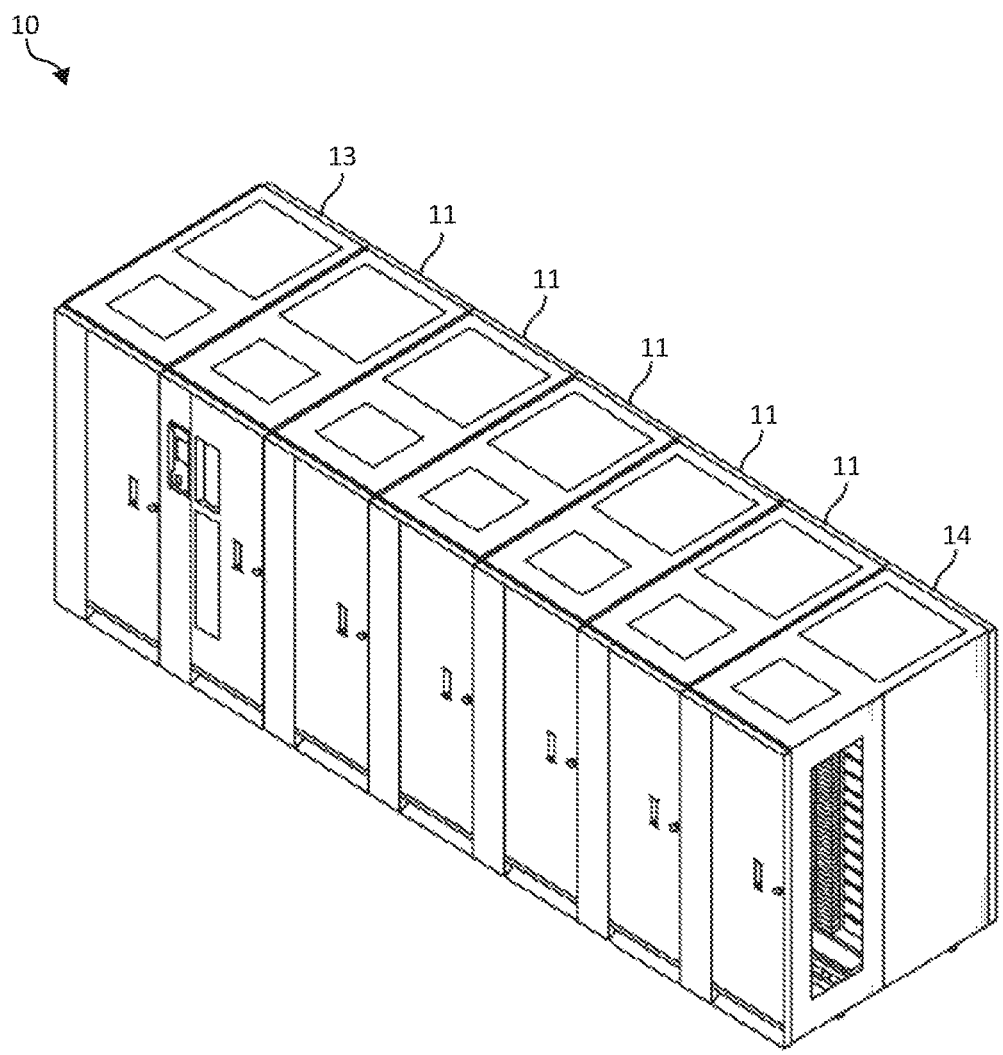
FIG. 1 is a block diagram of an automated data storage library in accordance with an embodiment of the present invention.

As previously stated, automated data storage libraries provide a means for storing large quantities of data on data storage media that are not permanently mounted in data storage drives, and that are stored in a readily available form on storage shelves or slots. One or more robot accessors retrieve selected data storage media from storage shelves and provide them to data storage drives. Typically, data stored on data storage media of an automated data storage library, once requested, is needed quickly. Automated data storage libraries may have logs for providing diagnostic information related to the operation and failure of the product. Logs may be exported through a user interface (e.g., a web user interface or command line interface). For example, when a library encounters a problem, an operator or service technician may use a web user interface on a customer port or a service port to collect logs before servicing the product. However, the collection of logs is neglected and not captured because operators or service technicians are mostly interested in getting the product running as quickly as possible and do not collect the logs. If a request is made for these logs (e.g., a root cause analysis, for example), a time period may have elapsed such that most or all of the information in the logs may have already wrapped and the data is lost forever.

In one aspect, an automated data storage library may include firmware in order to detect an error and may create a snapshot of one or more logs for later retrieval. The library firmware may also detect conditions that are not "library» detected errors", but instead are conditions that may indicate that service is being performed on the library and capture a snapshot of one or more logs for later retrieval. These non-library detected errors (or events) may include, but are not limited to, opening a library door (e.g., a library front door, a library back door, a library side door, a library top door, a library bottom door), a replacement of a library component, a reset of part or all of the library, a drive or library reset, and/or an "illegal request". Herein, door refers to any door, hatch, panel, cover, plate, magazine, wall, or portal, either hinged or not hinged, that can be opened or removed to gain access to part or all of the library. In one aspect, an illegal request may be a command that the library does not support (e.g., some libraries do not support the SCSI exchange medium command), an invalid command parameter (e.g., a command that contains an element address that is out of range for the library), a nonsensical command (e.g., a command to move a cartridge from an element that is empty). For example, an illegal request may be where a host application issues a command, such as issuing a request to move a cartridge in the automated data storage library from location "A" to location "B", and location "A" is empty and/or location "B" is already full. That is, either the host system cartridge map is corrupt or the library cartridge map is corrupt and/or the automated data storage library contains information about the automated data storage library different from the host system. For example, the knowledge possessed by the host system of where things are stored in the automated data storage library is different than the knowledge possessed by the automated data storage library of where things are stored in the automated data storage library. In one aspect, one or more sensors may be used for determining or detecting the opening and/or closing of a library front door, a library back door, a library side door, a library top door, a library bottom door. In another aspect, one or more sensors may be used for determining or detecting a replacement of a library component, a removal of a library component, an addition of a library component, a drive or library reset, a reset of part or all of the library.

The mechanisms of the illustrated embodiments provide a solution for automatic log collection of an automated data storage library by a processor, are provided. In one embodiment, by way of example only, a method for automatic log collection for an automated data storage library, again by a processor, is provided. An occurrence of an action (e.g., a triggering event) associated with an automated data storage library may be detected. A snapshot of one or more logs is captured in the automated data storage library upon detection of the triggering event. The snapshot of the one or more logs is stored by the automated data storage library. In one aspect, the automated data storage library is a tape library. In one aspect, a selected snapshot (that was previously stored) is overwritten by a new snapshot. A snapshot may be selected for overwriting or replacement if it is an older or the oldest snapshot of those stored. This may be desired if older snapshots are considered less relevant due to their age (e.g. if someone hasn't exported old snapshots then they may not be needed). Alternatively, a snapshot may be selected for overwriting or replacement if it is a newer or the newest snapshot of those stored. This may be desired if newer snapshots are considered less relevant because the new snapshot may encompass essentially the same information as a newer one that is already stored (e.g., two snapshots back-to-back may not be significantly different). Alternatively, a snapshot may be selected for overwriting or replacement based on the severity of the trigger that resulted in the snapshot, as compared to other stored snapshots or the new snapshot. For example, it may be desired to overwrite or replace a snapshot that resulted from a less significant trigger (e.g., a door open may be considered less significant than an illegal request). Alternatively, a snapshot may be selected for overwriting or replacement based on its similarity or dissimilarity to another stored snapshot or the new snapshot. For example, it may be desired to overwrite or replace a snapshot that resulted from the same or similar trigger (e.g. a two snapshots were captured from the same door opening). Still further, there may be some other criteria for selecting a snapshot to be overwritten. In one aspect, a trigger that would normally result in a snapshot being captured, or a snapshot being saved, may not result in the snapshot being captured and/or saved because of a snapshot filter. A snapshot filter is used to prevent too many snapshots from being captured from a repeating trigger. For example, there may be a snapshot filter that prevents a specific trigger, or a group of triggers, from causing more than one snapshot from being captured and/or saved if the trigger repeats within a certain period of time (e.g., ignore the trigger if it repeats in a one-hour period).

In another aspect, if a number of stored snapshots exceeds a threshold number of snapshots stored then a selected snapshot may be overwritten. In one aspect the triggers (aka "triggering events" include opening a library front door, opening a library back door, opening a library side door, opening a library top door, opening a library bottom door, a replacement of a library component, a reset of part or all of the library, a drive or library reset, and/or identifying a new unique identifier. Overwriting a snapshot may comprise a direct overwrite. Alternatively, overwriting a snapshot may comprise a modification (e.g., adding, replacing, erasing or removing one or more files, logs, snapshots, or log data). Alternatively, overwriting a snapshot may comprise erasing a previous snapshot and then storing the new snapshot. Still further, overwriting a snapshot may comprise storing the new snapshot and then erasing a previous snapshot. Herein, overwriting a snapshot refers to writing over an older snapshot with a newer snapshot, replacing an older snapshot with a newer snapshot, modifying an existing snapshot, erasing an older snapshot and then writing a newer snapshot, and/or writing a newer snapshot and then erasing an older snapshot.

In one aspect, the triggers include opening and/or closing of one or more doors to the library (e.g., a front door, a back door, a side door, top door, bottom door, etc.). Herein, for purposes of identifying a triggering event, opening a door and/or closing a door mean the same thing. The library may comprise one or more door sensors for detecting that a door has been opened. The door sensors may be optical sensors such as an emitter and detector that sense a door being opened or closed by the presence or absence of the light beam between the emitter and detector (e.g., an optical switch or a light curtain). The door sensors may be electrical sensors such as two metal contacts that make or break the electrical connection through the action of the door opening and/or closing (e.g., a mechanical switch). The door sensors may be proximity detectors (e.g., sensing the presence of a door by a change in magnetic properties seen at a detector). The door sensors may be magnetic sensors such as magnetic switches (e.g., a magnet and one or more electrical contacts that move under the influence of the magnet) or magnetic detectors (e.g., a magnet and a coil for sensing the presence of the magnet). There may be other forms of door sensors as are known to those of skill in the art. In one aspect, the triggers may include a drive or library reset. A drive or library reset may be initiated through a user interface of the library. A drive or library reset is usually initiated when someone suspects a potential problem with a drive, a potential problem with a component of the library, or a potential problem with the library in general (e.g., library firmware). If the drive or library reset is initiated through a user interface of the library then the trigger is detected by the user action (e.g., selecting a reset link in a graphical user interface). In an additional aspect, the triggers may include a component action. A component action is the removal, extraction, replacement, and/or insertion of a library component (e.g., a drive, a power supply, a library controller card, a robot accessor, and/or any other replaceable component in the library). A component may have a connector or wire that may be used to indicate that it is present or not present, and this may be how the library detects that the component has been removed, extracted, replaced or inserted. Alternatively, a component may have a communication interface that the library uses (e.g., a register interface, serial interface, Ethernet, etc.) and the communication interface may be how the library detects that the component has been removed, extracted, replaced or inserted (e.g., by failing to communicate, or communicating that the component has been reset, etc.). Still further, the component may have a unique identifier associated with it (e.g., a component serial number, MAC (Media Access Control) address, WWNN (World Wide Node Name), WWPN (World Wide Port Name), Fibre channel ID, SCSI ID, etc.) and the unique identifier may be how the library detects that the component has been removed, extracted, replaced or inserted (e.g., by reporting a different unique identifier, on a communication interface, then the library last saw for the component). In one aspect, the triggers may include a reset of all or at least a portion of the automated data storage library. The trigger events may also include a removal, replacement, or reset of a drive, a power supply, a library controller card, a robot accessor, a component of the library, or a combination thereof. In one aspect, the triggers may include a service action. A service action is an action or activity related to service of the library. For example, someone may access a user interface of the library and select a service action such as a component replacement procedure, a diagnostic procedure, etc. In this case, the library would detect a particular selection on the user interface and this would be the trigger. A service action is usually performed when someone is investigating a potential problem with the library. In another example of a service action, someone logging in to (or out of) a user interface under a service role may be the trigger.

The mechanisms of the illustrated embodiments may use an automated data storage library's firmware to detect actions (the trigger events) by an operator (user/technician) and take an (automatic) snapshot of one or more logs for later retrieval. For example, a user interface (e.g., a graphical user interface 'GUI' or command line interface) may be available for the library. A login operation may be performed in the user interface and navigated therein to a "service screen log download link" or selector (e.g., a button or command) in order to download any necessary logs that were previously snapshot as a result of a prior trigger. Herein, firmware refers to firmware, software, microcode, or any machine executable code, object code, and/or source code written in any programming language known to those of skill in the art including, but not limited to, C, C++, C#, Objective C, Assembly Language, VHDL, Verilog, JHDL, Java, Javascript, PHP, HTML, Bash, Python, Pearl, Pascal, Fortran, Cobol, APL, Swift, Ruby on Rails, BASIC, etc.

In some aspects, some triggers may not be library errors nor be indicative of a service operation, which may result in a snapshot being uncaptured. For example, host detected errors may not be detected in some cases by the library itself or they may not be seen as library errors. Accordingly, a host (e.g., host application or device driver) may detect certain errors, such as, for example, errors that may be caused by actions of a host or reported to the host, and the detected error may be used as triggers for the library to take a log snapshot.

In one embodiment, by way of example only, a method for automated data storage library snapshot for host detected errors, again by a processor, is provided. A host related triggering event associated with a host of an automated data storage library may be detected. A snapshot of one or more logs in the automated data storage library may be captured upon detection of the host related triggering event. The snapshot may be stored by the automated data storage library. The one or more logs include information related to the library, such as, diagnostic information, statistical information, configuration information, backup information, database information, or a combination thereof. In one aspect, one or more sensors may be used for determining the triggering events as described herein.

It should be noted that the present invention has application to any suitable storage subsystem with an automated storage media and retrieval library for storing and accessing storage media located within the subsystem. Further, storage media may be magnetic storage media such as magnetic tape and magnetic disk, optical storage media such as compact disk (CD) and digital versatile disk (DVD), electronic storage media such as swappable flash electrically programmable read only memory (flash EPROM) or any suitable equivalent nonvolatile removable storage media.

Figure 2:
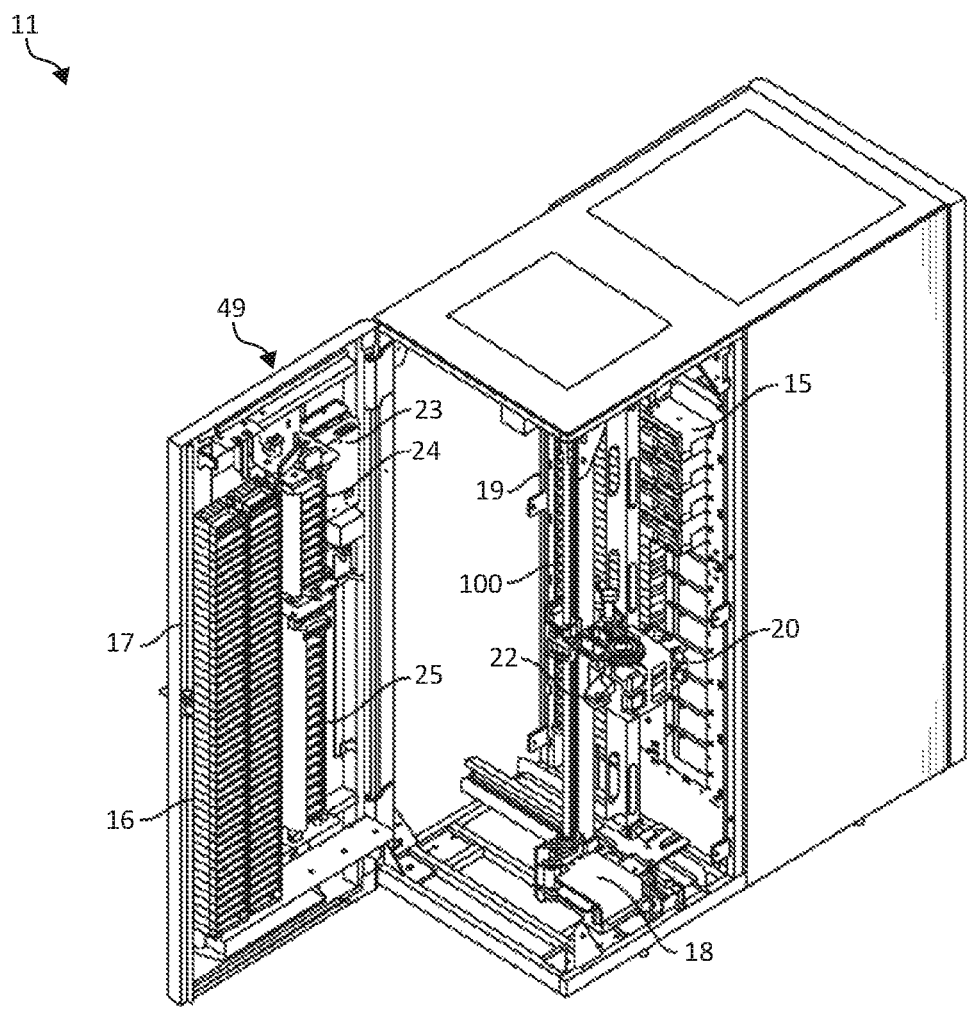
FIG. 2 is a block diagram of a frame of the automated data storage library of FIG. 1, with the view specifically depicting an exemplary basic configuration of the internal components of a library.

Turning now to FIGS. 1 and 2, an automated data storage library 10 which stores and retrieves data storage cartridges containing data storage media (not shown) at multi-cartridge deep slot cells 100 and single cartridge storage slots 16. It is noted that references to "data storage media" herein refer to the recording media of data storage cartridges, and for purposes herein the two terms may also be used synonymously. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage slots, deep slot cells, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage slots 16 on front wall 17 and a plurality of multi-cartridge deep slot cells 100 on rear wall 19, both for storing data storage cartridges that contain data storage media. The library 10 may also include one or more doors 49 (e.g., a front door, a side door, and/or a back door). That is, the library 10 access door 49 may comprise a door, hatch, cover, panel, magazine, or any other structure or assembly that may provide access to any portion of the library 10 that is not normally accessible.

The storage slots 16 are configured to store a single data storage cartridge, and the multi-cartridge deep slot cells 100 are configured to store a plurality of data storage cartridges arranged in sequential order of tiers from front to rear. The library also comprises at least one data storage drive 15 for reading and/or writing data with respect to the data storage media; and a first accessor 18 for transporting the data storage cartridges between the plurality of storage slots 16, the multi-cartridge deep slot cells 100, and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage cartridges to be added to the library inventory and/or removed from the library without disrupting library operation. Herein, adding data storage cartridges to the library may also be called "inserting" or "importing" data storage cartridges. Herein, removing data storage cartridges from the library may also be called "ejecting" or "exporting" data storage cartridges. Also herein, slots of the multi-cartridge deep slot cells 100, the single cartridge storage slots 16, the cartridge slot of drive(s) 15, and the slots of I/O station 24, 25 may all be referred to as storage slots. Thus, any location at which a data storage cartridge may reside within the library 10 may be referred to as a storage slot. The library 10 may comprise one or more storage frames 11, each having storage slots 16 and/or multi-cartridge deep slot cells 100 accessible by first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges, and another storage frame 11 may comprise storage slots 16 and/or multi-cartridge deep slot cells 100 and no other components.

The first accessor 18 comprises a gripper assembly 20 for gripping one or more data storage cartridges. The gripper assembly may include one or more sensors 22, mounted on or near the gripper 20, to "read" identifying information about the data storage cartridge and to locate fiducial marks for calibrating the library.

Figure 3:
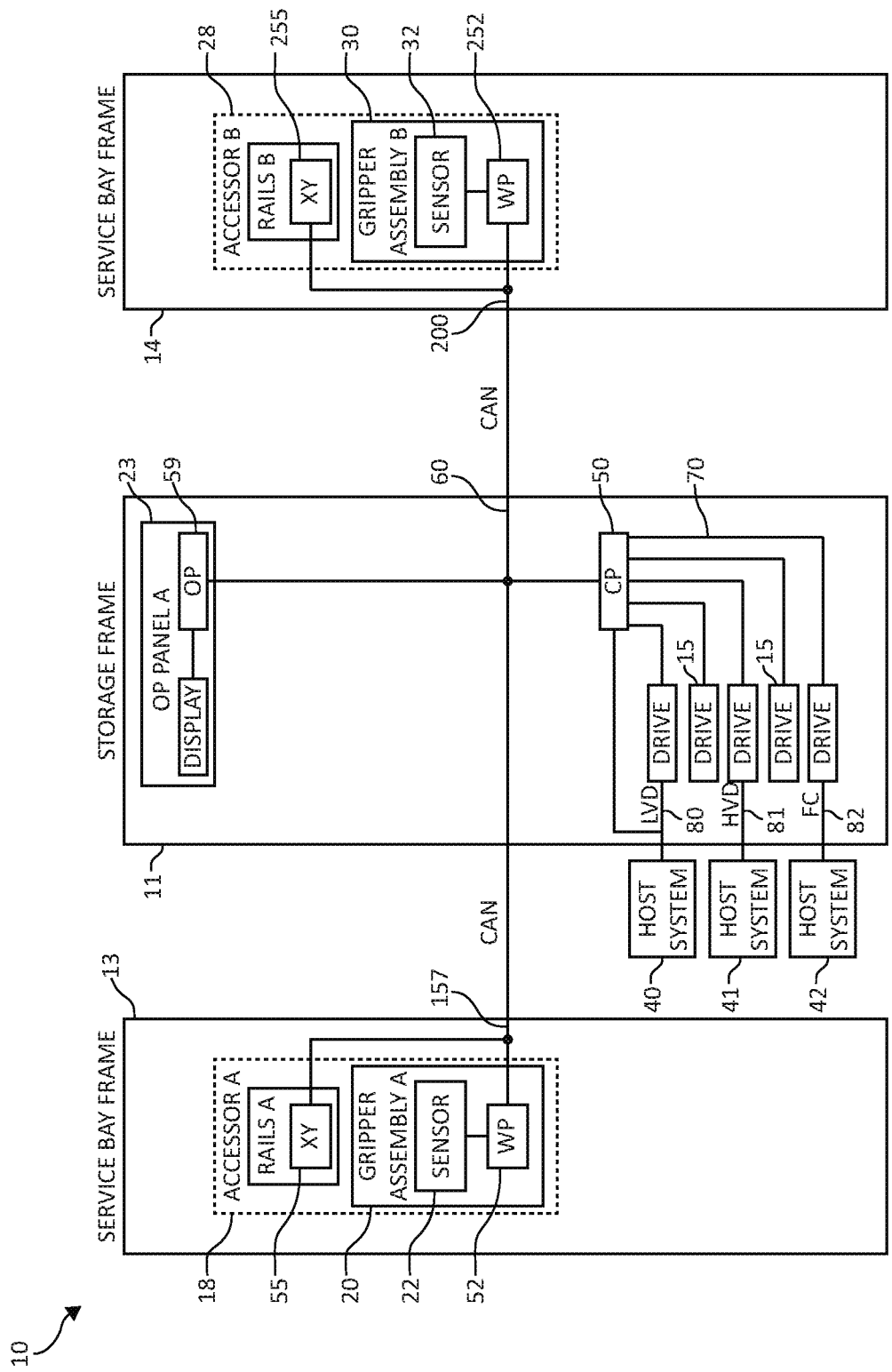
FIG. 3 is a block diagram of the automated data storage library of FIGS. 1 and 2, with the diagram depicting a library that employs a distributed system of modules with a plurality of processor nodes.

FIG. 3 illustrates an embodiment of an automated data storage library 10 of FIGS. 1 and 2, which employs a controller arranged as a distributed system of modules with a plurality of processor nodes. While the automated data storage library 10 is illustrated as employing a distributed control system, the present invention may be implemented in automated data storage libraries regardless of control configuration, such as, but not limited to, an automated data storage library having one or more library controllers that are not distributed.

The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include one or more sensors 22 to "read" identifying information about the data storage cartridges and to locate and calibrate fiducial marks. The right hand service bay 14 is shown with a second accessor 28. The second accessor 28 comprises a gripper assembly 30 and may include one or more sensors 32 to "read" identifying information about the data storage cartridges and to locate fiducial marks. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage cartridge at the storage slots 16 and multi-cartridge deep slot cells 100, or input/output stations 24, 25, and to mount and demount the data storage cartridge at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage cartridges and move the cartridges, for example, between the storage slots 16 and the data storage drives 15. The commands are typically logical commands identifying the cartridges or cartridge media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a library controller, which in one embodiment comprises a distributed control system receiving the logical commands from hosts, determining the required actions, and converting the actions to physical movements of and actions by first accessor 18 and/or second accessor 28.

In the exemplary library, the distributed control system comprises a plurality of processor nodes, each having one or more computer processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and/or the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network or Ethernet.

Additional storage frames 11 may be provided and each is coupled to the adjacent storage frame. Any of the storage frames 11 may comprise communication processor nodes 50, storage slots 16, multi-cartridge storage cells 100, data storage drives 15, and networks 60. Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage cartridges, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13. Alternatively, one or more of the processor nodes (XY 55, WP 52, CP 50, OP 59, XY 255, and WP 252) may comprise dual networks (not shown) to allow independent redundant communication between the processor nodes and/or the accessors 18, 28.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

An automated data storage library 10 may comprise one or more controllers to direct the operation of the automated data storage library. Host computers and data storage drives typically comprise similar controllers. A library controller may take many different forms and may comprise, for example but not limited to, an embedded system, a distributed control system, a personal computer, or a workstation. Essentially, the term "library controller" as used herein is intended in its broadest sense as a device that contains at least one computer processor, as such term is defined herein.

Figure 4:
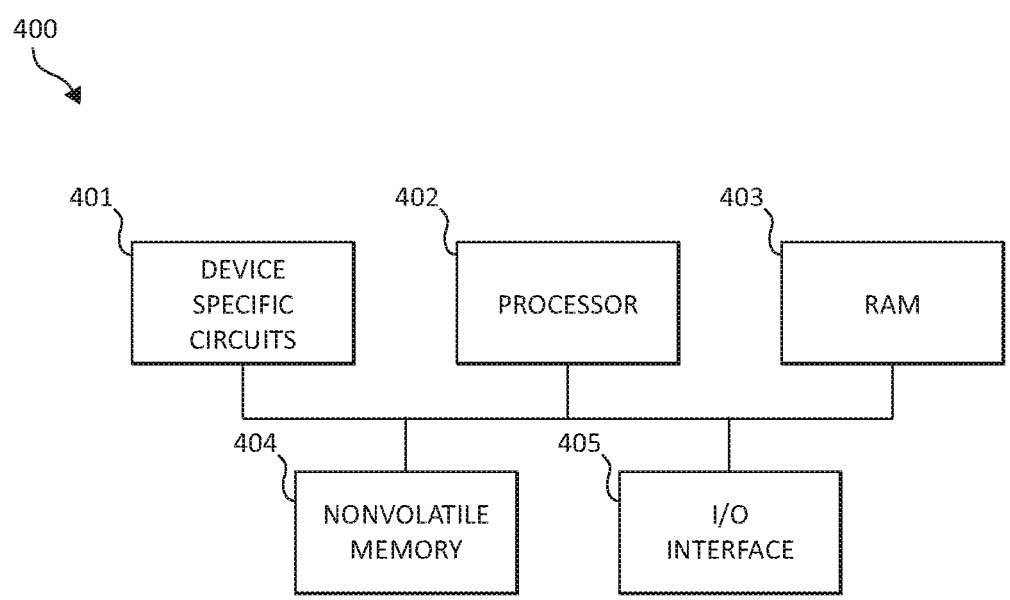
FIG. 4 is a block diagram depicting an exemplary controller configuration.

FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 may be used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, CompactFlash (CF), Secure Digital (SD), micro-SD, and hard disk drives. The nonvolatile memory 404 may be used to hold the executable firmware and any nonvolatile data. The I/O interface 405 comprises a communication interface that allows the processor 402 to communicate with devices external to the controller. Examples may comprise, but are not limited to, serial interfaces, USB (Universal Serial Bus), Ethernet, or SCSI (Small Computer Systems Interface). The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the present invention may be implemented in various automated data storage libraries regardless of control configuration, such as, but not limited to, an automated data storage library having one or more library controllers that are not distributed. A library controller may comprise one or more dedicated controllers of a prior art library. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, library controller may comprise a single processor or controller or it may comprise multiple processors or controllers.

Figure 5A:
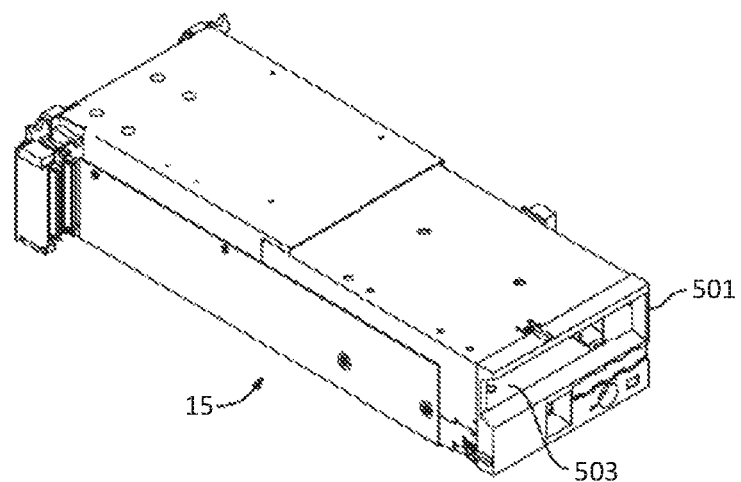
FIGS. 5A and 5B are isometric views of the front and rear of a data storage drive of the automated data storage library of FIGS. 1, 2 and 3.
Figure 5B:
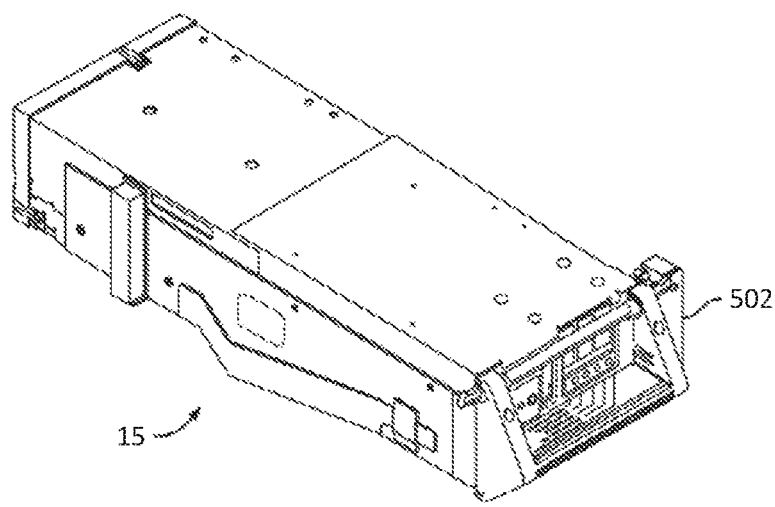

FIGS. 5A and 5B illustrate an embodiment of the front 501 and rear 502 of a data storage drive 15. In the example, the data storage drive 15 comprises a hot-swap drive canister. This is only an example and is not meant to limit the invention to hot-swap drive canisters. In fact, any configuration of data storage drive may be used whether or not it comprises a hot-swap canister. A data storage cartridge may be placed into the data storage drive 15 at opening 503. As discussed above, a data storage drive 15 is used to read and/or write data with respect to the data storage media of a data storage cartridge, and may additionally communicate with a memory which is separate from the media and is located within the cartridge.

Figure 6:
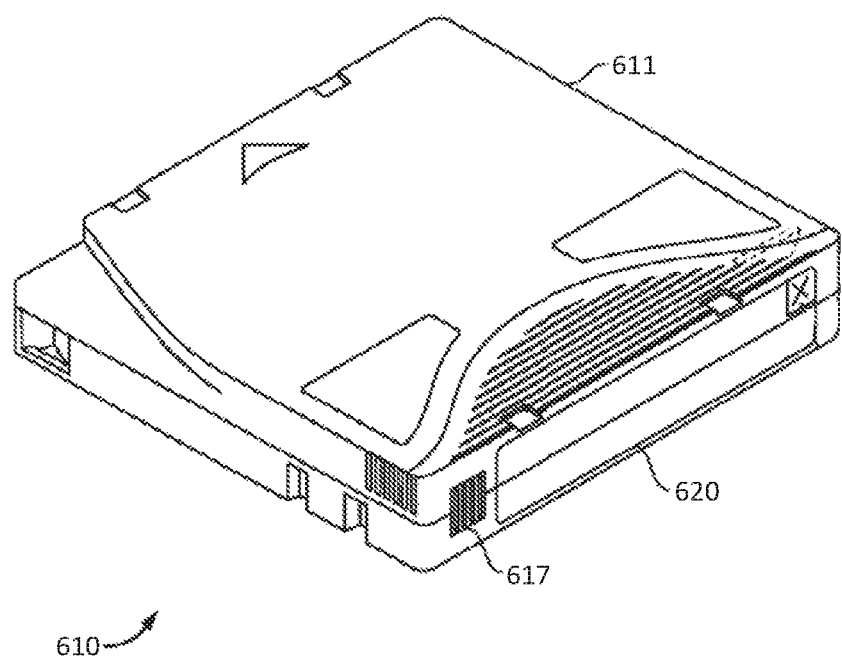
FIG. 6 is an isometric view of an example of an element, such as a cartridge, which may be placed in a storage slot of the automated data storage library of FIGS. 1, 2 and 3, in accordance with an embodiment of the present invention.

FIG. 6 illustrates an embodiment of a data storage cartridge 610 with cartridge shell 611, front label area 620, and write protect switch 617.

Figure 7:
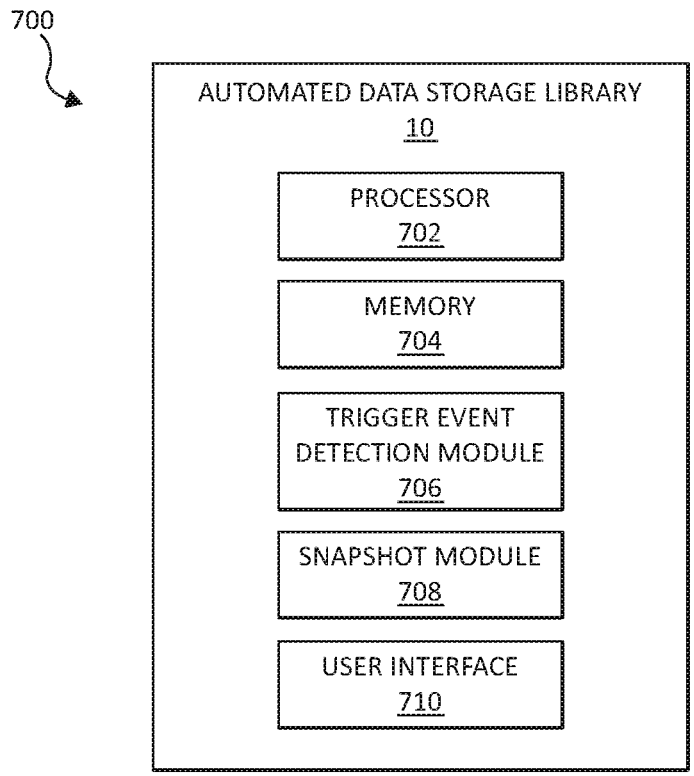
FIG. 7 is an additional block diagram depicting various user hardware and computing components functioning in accordance with aspects of the present invention.

Turning now to FIG. 7, a block diagram depicting exemplary functional components 700 according to various mechanisms of the illustrated embodiments, is shown. Automated data storage library 10 is again shown, incorporating processing unit 702 to perform various computational, data processing and other functionality in accordance with various aspects of the present invention. Memory 704 may include RAM and/or nonvolatile memory. A snapshots module 708 is shown, along with a trigger event detection module 706.

As one of ordinary skill in the art will appreciate, the depiction of the various functional units in automated data storage library 10 is for purposes of illustration, as the functional units may be located within automated data storage library 10 or elsewhere within and/or between distributed computing components. The snapshot module 708 may include a data repository of various snapshots of the automated data storage library 10 with associated metadata information. The snapshot module 708 may work in concert with processing unit 702 and memory 704 to accomplish various aspects of the present invention, such as, for example capturing a snapshot of one or more logs associated with the automated data storage library 10 upon detection of a triggering event. The snapshot module 708 may include snapshots of one or more logs related to the items or actions associated with one or more triggering events as described herein. The snapshot module 708 may also monitor and store the snapshots and use a snapshot threshold, or a snapshot filter in order to control an amount of saved snapshots.

Trigger event detection module 706 may work in concert with processing unit 702 and memory 704 to accomplish various aspects of the present invention. For example, the trigger event detection module 706 may include the library firmware of the automated data storage library 10 and may be used to detect actions (triggers) by an operator (user/technician) and take an (automatic) snapshot of one or more library logs for later retrieval. In one aspect, trigger event detection module 706 may undergo various data analytics functions associated with identifying and detecting a triggering event. Trigger event detection module 706 may make decisions in conjunction with the snapshot module 704 to detect the triggering event so as to immediately trigger the snapshot module to capture and generate a snapshot of one or more logs of the automated data storage library 10. As one of ordinary skill in the art will appreciate, the trigger event detection module 706 and snapshot module 708 may implement mathematical modeling, snapshot functionality, sensing functionality, or other data processing technologies to carry out the various mechanisms of the illustrated embodiments. As one of ordinary skill in the art will appreciate, trigger event detection module 706 and/or snapshot module 708 may be implemented in library firmware and may be executed by a single processor or by multiple processors. For example, different discrete or atomic operations associated with trigger event detection module 706 and/or snapshot module 708 may be spread among multiple processors functions, threads, processes, code images, files, etc. In addition, trigger event detection module 706 and/or snapshot module 708 may be implemented in library hardware such as FPGA (Field Programmable Gate Array), ASIC (Application Specific Integrated Circuit), discrete logic, or the like. Still further, trigger event detection module 706 and/or snapshot module 708 may be implemented in a combination of library firmware and hardware.

In one aspect, logs may be exported via user interface 710 (e.g., a graphical user interface). For example, an operator or service technician may use a user interface 710 on a customer port or a service port to export logs or snapshots associated with snapshot module 708 before or after servicing the product. If a request is made for these logs (e.g., a root cause analysis) the snapshot module 708 may provide to the user interface 710 one or more snapshots relating to one or more triggering events. In this way, most or all of the information in the one or more logs captured via the snapshots are preserved. This functionality is illustrated by example with the user interface (GUI) 710, which provides information from the processing unit 702 and memory 704, or receives input and/or selection data from the user.

In one aspect, the user interface (e.g., a graphical user interface 'GUI') may be associated with the library 10. A login operation may be performed in the user interface 710 and navigated therein to display a "service screen log download link" or selector (e.g., a button) in order to download any necessary logs or snapshots to a storage device.

With the foregoing functional components, the mechanisms of the illustrated embodiments may detect an action (or "trigger" or "triggering event") for capturing or taking a log snapshot. In one aspect, the detected triggering event may be the opening of a front door (or operator door) of the library. For example, a front door is primarily closed and rarely opened in a library because the opened door may cause interruption to work flow and disruption to one or more operations. Input/Output (I/O) stations may be used to move media in and out of the library so the front door typically not used for moving media in or out of the library except for bulk loading of media. The front door may be opened to diagnose problems with the accessor or drives. In one aspect, the actual logs that are contained in the snapshot may be related to the items or actions associated with opening the front door, such as logs for data storage drives (e.g., tape drives) in a frame, accessor logs, and logs related to the data storage media. In the event that opening the front door was due to something other than a service related operation, there's no harm in having an extra set of logs in temporary storage.

In one aspect, an action for taking a snapshot may be opening a back door (or service door) of the library. A back door is primarily closed given the back door is where drives, power supplies, library controller, and other components may be serviced or replaced. The back door is primarily opened to diagnose problems with the drives, power system, communication system, library controller, etc. Accordingly, opening the back door of the library may be a trigger to collect a log snapshot. In one aspect, the actual logs that are contained in the snapshot may be related to the items or actions associated with a back door opening. For example, logs for the drives in a particular frame, library controller logs, logs related to the power system, logs related to the communication system, and the like. In the event that opening the back door was due to something other than a service related operation, there's no harm in having an extra set of logs in temporary storage.

In another embodiment, an action for taking a log snapshot may be opening a side door (or service door) of the library. A side door is primarily closed given the accessor is serviced or replaced on the side of the library. In one aspect, the actual logs that are contained in the snapshot may be related to the items or actions associated with side door opening, such as, for example, accessor logs. In the event that the opening door was due to something other than a service related operation, there's no harm in having an extra set of logs in temporary storage.

In another embodiment, an action or trigger for taking a log snapshot may be removing, extracting, adding, inserting, and/or replacing a component of the library. These components, for example, may include drives, power supplies, library controller card, or any other replaceable components of the library. The component replacement, extraction, or resetting may be detected upon a component of the library being undetected (e.g., absent) for a selected period of time. The period of time may comprise a very short interval (microseconds, milliseconds, seconds) or may comprise a longer interval (seconds, minutes, hours). There may be different periods of time depending on the component involved. In one aspect, the detection operation may occur via a presence sensor or indicator, a logic state of one or more signals connecting the component to the library, a lack of communication, and/or by initiating a replacement procedure on a user interface. Alternatively, the component replacement may be detected because a unique identifier has changed, such as, for example, a change of address for a communication component media access channel (MAC) address, a change in a drive world-wide node name, or a change in a component serial number, etc.

In another embodiment, an action for taking a log snapshot would be an operator or service technician initiating a drive or library reset. A drive or library reset is an action that is usually performed when there is suspicion of a problem with a drive or the library. The reset may be a software directed reset (such as a command to a drive or the library to restart the firmware), may be a hardware directed reset (such as a watch dog time-out, triggering of a hardware reset line), or it may be a power-down and subsequent power-up of a drive, library controller, or the entire library. The library may comprise a single processor, computer, controller, etc. Alternatively, the library may comprise multiple processors, computers, controllers, etc. (e.g., a distributed control system). Therefore, library controller may refer to one or more processors, computers, controllers, etc. To keep the library storage from being overwhelmed from a large number of snapshot logs, there could be a limited number of snapshots that are stored at any point in time such that a selected snapshot is overwritten by a new one. A snapshot may be selected for overwriting because it is an older snapshot or the oldest snapshot, or because it is a younger snapshot or the youngest snapshot. Alternatively, other algorithms could be used to determine which snapshot to overwrite such as one that is evaluated to be less relevant or less critical than others (or the trigger was less relevant or less critical), or one that is more or less similar than another in terms of the trigger that resulted in the snapshot. Another method of controlling the number or frequency of snapshots is a snapshot filter. A snapshot filter may be used to prevent a snapshot from being captured and/or stored when a triggering event occurs, or to disable one or more triggering events (thereby preventing the snapshot from being captured and saved because the event was not detected). The snapshot filter may be based on time. For example, ignore a particular trigger if it has already occurred in the last 24 hours. The logs may comprise trace information (what was the library doing), diagnostic information (what kinds of errors or problems were encountered), statistical information (what was the performance or usage of various library components), backup information (a backup of one or more components of the library state, settings, or configuration), database information (the contents of one more library databases), etc.

In another embodiment, an action for taking a log snapshot would be a user or service technician initiating a service action. A service action is usually performed when there is suspicion of a problem with a drive or the library. One example of a service action is a drive replacement procedure. A drive replacement procedure may be initiated by logging into a library user interface under a service role and selecting a drive replacement menu item. In addition, a service action may be initiated for any component of the library. Another example of a service action may include a library calibration. A library calibration is a procedure that calibrates one or more components of the library to improve the precision on which they operate. For example, a library gripper may be calibrated to improve the ability of the gripper to accurately find and grip cartridges. In another example, a bar code reader may be calibrated to better position and read bar code labels on data storage cartridges or elsewhere in the automated data storage library. Another example of a service action may include a diagnostic procedure. For example, the library may support menu items on a user interface that allow a user or service technician to run different diagnostic procedures (e.g., drive diagnostics, library diagnostics, performance diagnostics, gripper diagnostics, etc.). Another example of a service action may include someone logging into a user interface of the library under a service role. A service role is usually used by someone that performs service or checkout of an automated data storage library, so this may be a good indication that either a service operation is likely or that something may be suspect with respect to the normal operation of the library.

Figure 8:
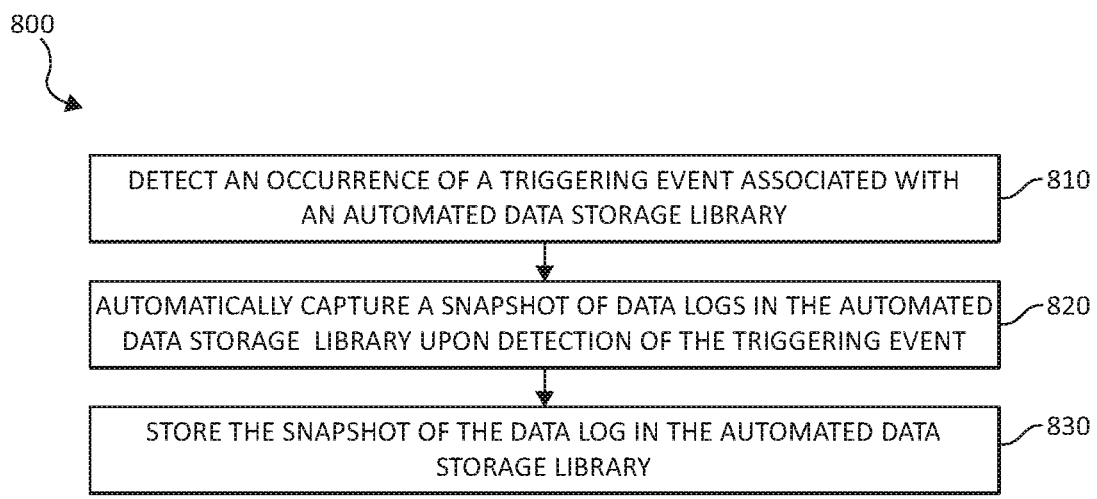
FIG. 8 is an additional flowchart diagram depicting an additional exemplary method for automatic log collection for an automated data storage library by a processor; again in which aspects of the present invention may be realized.

Turning now to FIG. 8, a method 800 for automatic log collection of an automated data storage library by a processor is depicted, in which various aspects of the illustrated embodiments may be implemented. The functionality 800 may be implemented as a method executed as instructions on a machine, where the instructions are included on at least one computer readable medium or on a non-transitory machine-readable storage medium. Starting in block 810, a triggering event associated with an automated data storage library may be detected. A snapshot of one or more logs associated with the automated data storage library may be captured upon detection of the triggering event, as in block 820. Herein, captured refers to the freezing (e.g., stop adding or modifying information to a log or snapshot), collecting (e.g., gathering different logs, files, snapshots, and/or log data), combining (e.g., concatenating files, logs, snapshots, and/or log data), compressing (e.g., compressing files, logs, snapshots, and/or log data), copying (e.g., copying files, logs, snapshots, and/or log data), saving (e.g., saving files, logs, snapshots, and/or log data), preserving (e.g., preserving files, logs, snapshots, and/or log data), organizing (e.g., organizing files, logs, snapshots, and/or log data), and/or sorting (e.g., sorting files, logs, snapshots, and/or log data), of information contained in one or more logs, files, or snapshots. The one or more logs may include library logs (e.g., logs maintained by library firmware or software), drive logs (e.g., logs maintained by automated data storage drives), component logs (e.g., logs associated with any components of the library such as power supplies, Ethernet switches, etc.), device logs (e.g., logs associated with any devices connected to the library such as a management console, a service machine, an encryption key server, etc.). The logs may contain trace information (e.g., information related to what the library, drive, component or device was doing), diagnostic information (e.g., information related to problems or errors that may have been encountered by the library, drive, component, or device), statistical information (e.g., information related to the performance or usage of various elements of the library, drive, component, or device), configuration information (e.g., information related to settings and preferences of the library, drive, component, or device), backup information (e.g., a backup of the state, settings, or configuration of the library, drive, component, or device), database information (e.g., information related to any databases that the library, drive, component, or device may have). A snapshot of the one or more logs in an automated data storage library may be stored, as in block 830. The snapshot is stored by the automated data storage library and it may be stored within the library itself (e.g., on a hard disk, in nonvolatile memory, CompactFlash card, etc.) or it may be stored outside the library (e.g., on a network attached storage device, on a component associated with the library such as a management console, etc.).

In one aspect, the triggering event may be opening a library door (e.g., opening a library front door, opening a library back door, opening a library side door, etc.), a replacement of a library component, a reset of part or all of the library, a drive or library reset, and/or identifying a new unique identifier.

Figure 9:
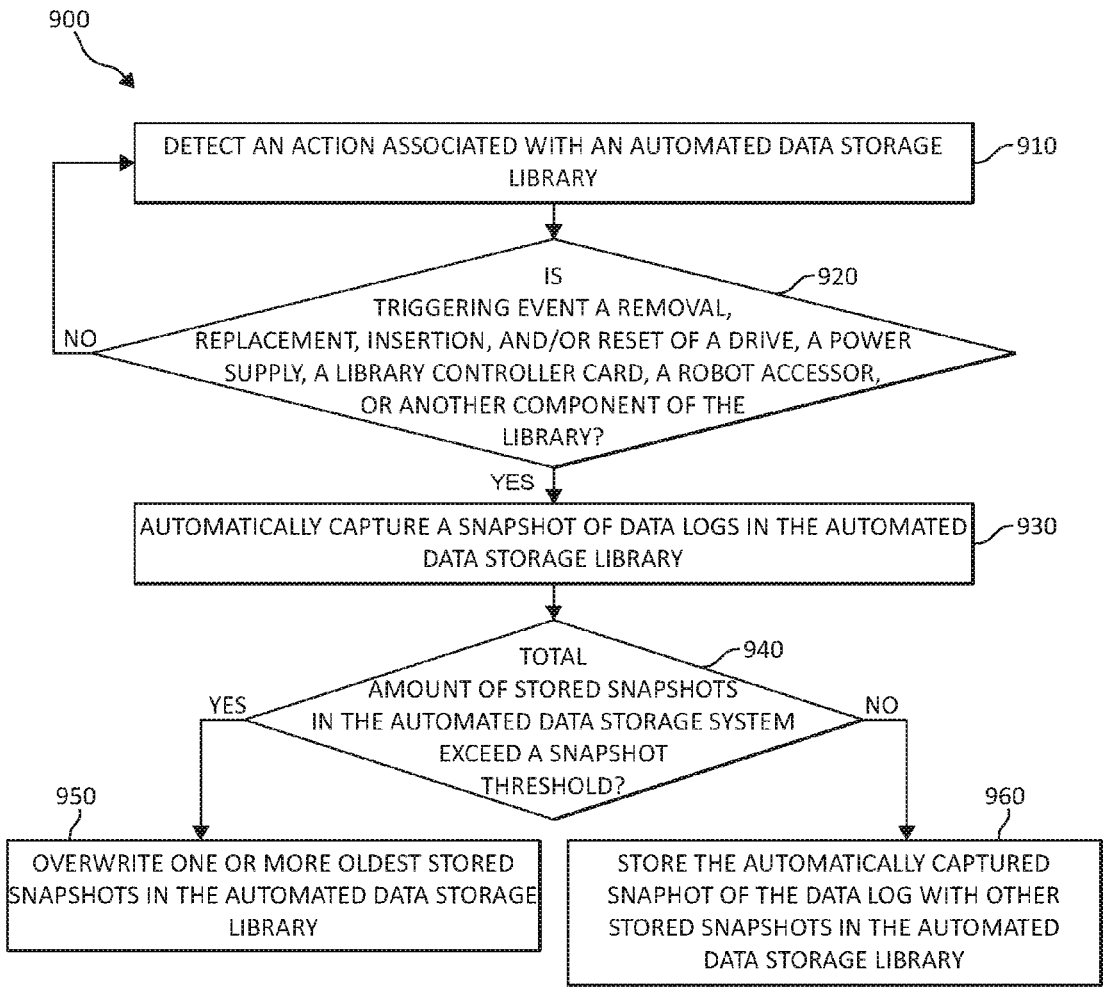
FIG. 9 is an additional flowchart diagram depicting an exemplary method for automatic log collection for an automated data storage library by a processor; again in which aspects of the present invention may be realized.

Turning now to FIG. 9, a method 900 for automatic log collection of an automated data storage library is depicted, in which various aspects of the illustrated embodiments may be implemented. The functionality 900 may be implemented as a method executed as instructions on a machine, where the instructions are included on at least one computer readable medium or on a non-transitory machine-readable storage medium. Starting in block 910, an action associated with an automated data storage library may be detected. A determination operation is performed to determine if the triggering event is a component action. A component action is the removal, replacement, insertion, and/or reset of a library component (e.g., a tape drive, a power supply, a library controller card, a robot accessor, or another component of the library), as in block 920. If no, the automated data storage library may resume normal operation or return to block 910. If yes at block 920, a snapshot of one or more logs in the automated data storage library may be captured upon detection of the triggering event, as in block 930. A determination operation is performed to determine whether a total amount of stored snapshots in the automated data storage library exceeds a snapshot threshold, as in block 940. If yes at block 940, one or more older or oldest stored snapshots (as compared to other stored snapshots) in the automated data storage library may be erased and/or overwritten with the newly captured snapshot (e.g., most recent snapshot), as in block 950. If no at block 940, the captured snapshot of the data log may be stored with other stored snapshots in the automated data storage library, as in block 960.

Figure 10:
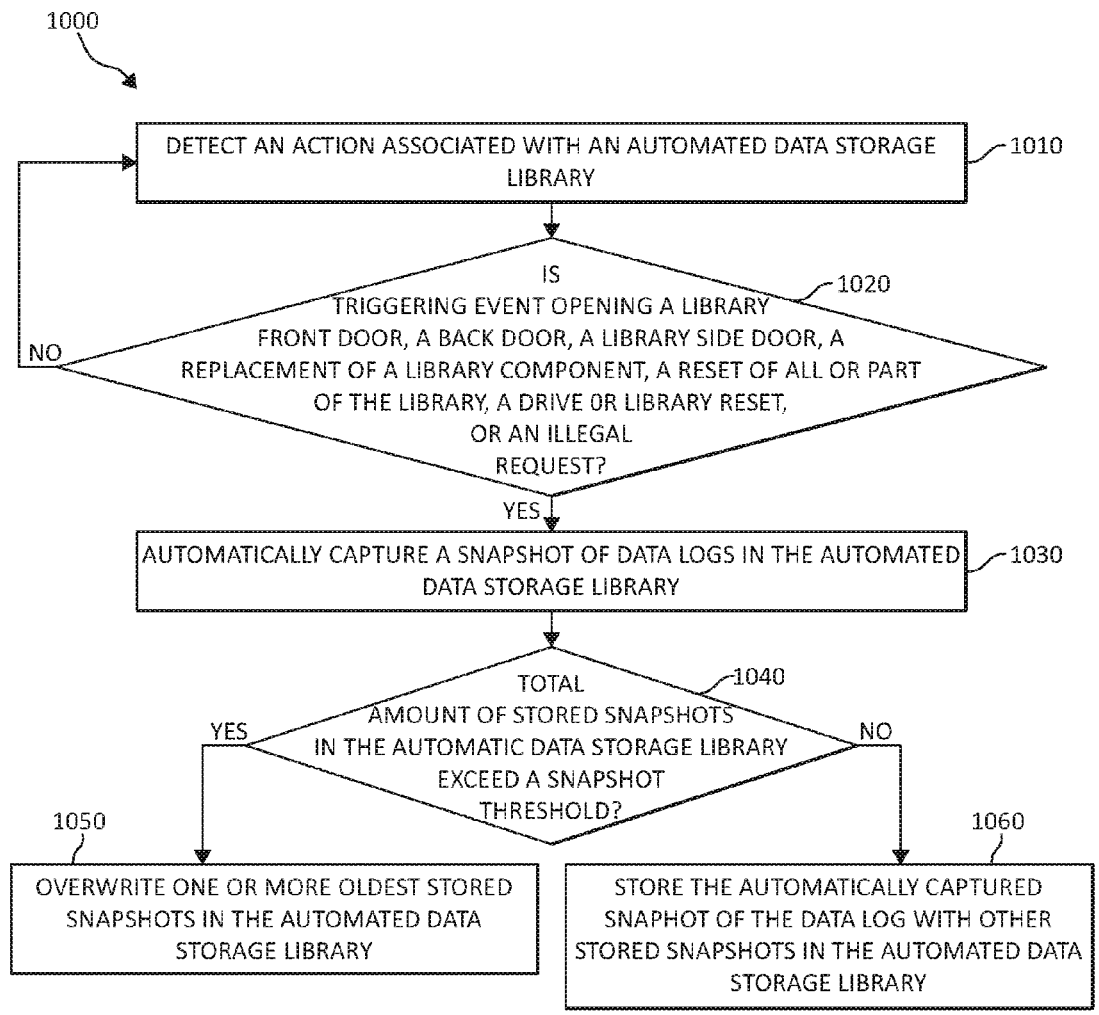
FIG. 10 is an additional flowchart diagram depicting an exemplary method for automatic log collection for an automated data storage library by a processor; again in which aspects of the present invention may be realized.

Turning now to FIG. 10, a method 1000 for automatic log collection of an automated data storage library is depicted, in which various aspects of the illustrated embodiments may be implemented. The functionality 1000 may be implemented as a method executed as instructions on a machine, where the instructions are included on at least one computer readable medium or on a non-transitory machine-readable storage medium. Starting in block 1010, an action associated with an automated data storage library may be detected. A determination operation is performed to determine if the triggering event is opening a library door (e.g., a front door, a library back door, a library side door, a library top door, a library bottom door), a replacement of a library component, a reset of part or all of the library, a drive or library reset, and/or an "illegal request", as in block 1020. If no, automated data storage library may resume normal operation or return to block 1010. If yes at block 1020, a snapshot of one or more logs in the automated data storage library may be captured (or saved) upon detection of the triggering event, as in block 1030. A determination operation is performed to determine whether a total amount of stored snapshots in the automated data storage library exceeds a snapshot threshold, as in block 1040. If yes at block 1040, one or more oldest stored snapshots (as compared to other stored snapshots) in the automated data storage library may be erased and/or overwritten with the captured snapshot (e.g., most recent snapshot), as in block 1050. If no at block 1040, the captured snapshot of the data log may be stored with other stored snapshots in the automated data storage library (without overwriting any other stored snapshots), as in block 1060.

Figure 11:
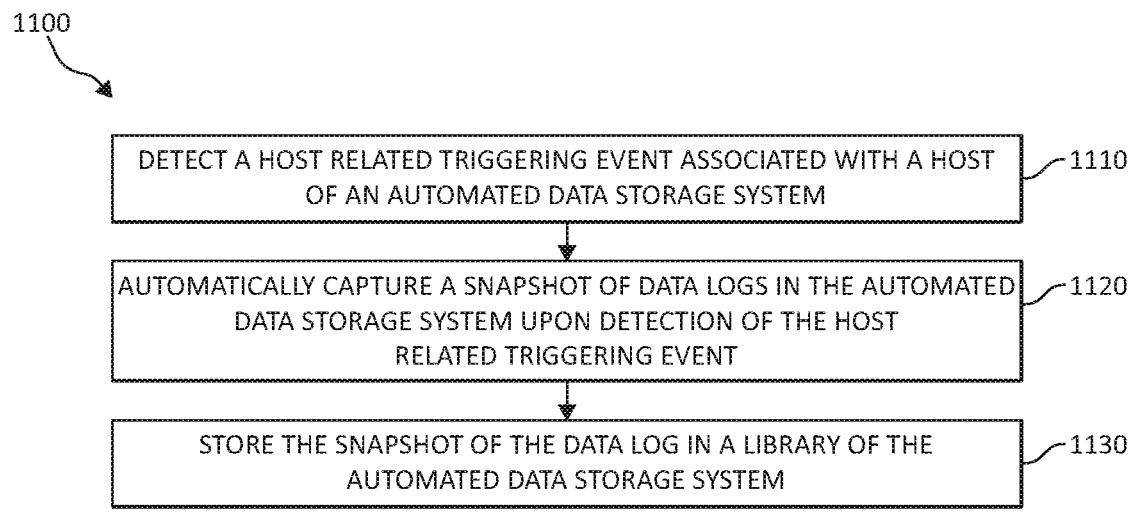
FIG. 11 is a flowchart diagram depicting an exemplary method for automated data storage library snapshot for host detected errors by a processor in which aspects of the present invention may be realized.

Turning now to FIG. 11, a method 1100 for automated data storage library snapshot for host detected errors is depicted, in which various aspects of the illustrated embodiments may be implemented. The functionality 1100 may be implemented as a method executed as instructions on a machine, where the instructions are included on at least one computer readable medium or on a non-transitory machine-readable storage medium. Starting in block 1110, a host related triggering event associated with a host of an automated data storage library may be detected. In one aspect, the host related triggering event includes an abort operation in the automated data store library, a task management information unit (IU) packet, a logical unit reset, a data packet having a recovery requested (RRQST) bit, a data packet having an interface changed (INTFC) bit, a data packet having a tape alert status flag changed (TAFC) bit, an encryption error, a send diagnostic command, an indication command issued from the host to library. A snapshot of one or more logs in the automated data storage library may be captured upon detection of the host related triggering event, as in block 1120. The snapshot of the one or more logs may be stored by the automated data storage library, as in block 1130.

In one embodiment, an action (e.g., a host detected trigger event related to host detected errors) for taking a log snapshot may be an illegal request from a host. In one aspect, an illegal request may be a command that the library does not support. For example, some libraries do not support the SCSI exchange medium command or the Rezero Unit command. In another aspect, an illegal request may be an invalid command parameter. For example, a command that contains an element address that is out of range for the library or a mode sense command that requests an unsupported mode page. In another aspect, an illegal request may be a nonsensical command. For example, a command to move a cartridge from an element that is already empty, or a command to move a cartridge to an element that is already full, or a command use a medium transport element that doesn't exist.

In one embodiment, a Task Management information unit (IU) packet (e.g., a small computer system interface (SCSI) T10 Automation Drive Interface (ADI) Task Management information unit (IU) packet) may be a host detected trigger event. For example, an IU packet may be used by a drive to communicate a logical unit reset to an attached library. In another example, an IU packet may be used to communicate a command abort to an attached library. The SCSI Task management IU packet may be sent by an initiator to request that a task management function be processed. The Task Management IU packet itself and/or a specific Task Management function value may be the host detected trigger event. The library may detect the Task Management Information Unit (IU) packet through an interface of the library. For example, an interface (e.g., serial or Ethernet) that allows the library to communicate with a drive or control port. The IU packet may be received by the library over this interface.

In one embodiment, an abort operation may be the host detected trigger event. For example, an SCSI T10 ADI specification may provide the means for the host control path to go through the tape drive. In this example, the tape drive receives a host command for the library and the tape drive forwards that command to the library. In one example of an abort operation, a drive may abort a command and fail the command to the host computer if the drive does not receive a response from the library within a selected or defined period of time. The failure to receive the response from the library may be the result of a library code bug (error), a drive code bug, or other library related application error or time out. The abort operation for a command may also be caused by the library failing to complete within a selected time period any commands in the library's work queue (including the command that was aborted). In another example of an abort, a host interface to the drive may have connectivity issues and the drive may abort the command as the result of the host connectivity problems. The library may detect the Abort through an interface of the library. For example, an interface (e.g., serial or Ethernet) that allows the library to communicate with a drive or control port. In another example, an interface (e.g., SCSI, Fibre Channel, or Ethernet) that allows the library to communicate with a host computer. The Abort may be received by the library over one of these interfaces.

In one embodiment, a logical unit reset may be a host detected trigger event. For example, the host may send a command to the library without receiving a response within a selected or predetermined time and the logical unit may be reset by the host as an attempt at error recovery. In another example of a logical unit reset, the host interface may have connectivity issues that result in the logical unit reset as part of a host interface error recovery. The library may detect the Logical Unit Reset through an interface of the library. For example, an interface (e.g., serial or Ethernet) that allows the library to communicate with a drive or control port. In another example, an interface (e.g., SCSI, Fibre Channel, or Ethernet) that allows the library to communicate with a host computer. The Logical Unit Reset may be received by the library over one of these interfaces.

In one embodiment, a data packet with the recovery requested (RRQST) bit (e.g., SCSI T10 ADI VHF data packet with an RRQST bit) set may be a host detected trigger event. For example, the RRQST bit may indicate that there is more detail in a recovery request log page. The recovery request log page may contain a recovery procedure, in which more detail can be provided through a read buffer command. In one example, a set RRQST bit may indicate a problem that the drive encountered while trying to encrypt data, unencrypt data, obtain an encryption key, etc. In another example, a set RRQST bit may indicate that a drive panic occurred. A drive panic is an extreme error where the drive performs a self-reset in an attempt to recover. A very high frequency (VHF) data packet recovery request bit, the recovery request log page, the recovery procedure, and/or the contents of any related read buffer may be the trigger event (e.g., the host detected trigger event). The library may detect the VHF data packet RRQST bit through an interface of the library. For example, an interface (e.g., serial or Ethernet) that allows the library to communicate with a drive or control port. The VHF data packet may be received by the library over this interface.

In one embodiment, a data packet with an interface changed (INTFC) bit (e.g., SCSI T10 ADI VHF data packet with an INTFC bit) set may be a trigger event (e.g., a host detected trigger event). For example, the INTFC bit may indicate that one or more fields in the primary port status log parameters have changed. A change in one or more of these fields may be the result of a problem with a connected host interface device (e.g., a host bus adapter, a Fibre Channel switch, an Ethernet switch, etc.). In another example, the host, or someone using an interface of the host, may change host bus adapter settings that result in a change to the primary port status log parameters (e.g., speed or topology settings). The VHF data packet INTFC bit and/or primary port log parameter changes may be the trigger event (e.g., the host detected trigger event). The library may detect the VHF data packet INTFC bit through an interface of the library. For example, an interface (e.g., serial or Ethernet) that allows the library to communicate with a drive or control port. The VHF data packet may be received by the library over this interface.

In one embodiment, a data packet having a tape alert status flag changed (TAFC) bit (e.g., a SCSI T10 ADI VHF data packet with the TAFC) bit may be the trigger event (e.g., the host detected trigger event). For example, the TAFC bit may indicate that at least one tape alert state flag has changed. The specific tape alerts are then read from a tape alert log page (e.g., Log Sense Page 2E for a tape alert page of an IBM® 3584 Tape Library). A change in one or more tape alert flags may indicate a problem with the data storage drive or the data storage media for example. Tape alert flags may be reported to, or read by, the host. The VHF data packet TAFC bit and/or a one or more tape alert flag indications may be the trigger event. The library may detect the VHF data packet TAFC bit through an interface of the library. For example, an interface (e.g., serial or Ethernet) that allows the library to communicate with a drive or control port. The VHF data packet may be received by the library over this interface.

In one embodiment, an encryption error may be the trigger event (e.g., the host detected trigger event). For example, the tape drive may support encryption and may communicate (either directly or indirectly) with a key manager for supplying the appropriate encryption keys to the tape drive. A failure in the key exchange process (e.g., a time-out, a missing key, a rejected request, and the like) may be the trigger event. The library may detect the encryption error through one or more interfaces of the library. For example, there may be an interface (e.g., Ethernet) that allows the library to communicate with a key manager and/or there may be an interface (e.g., serial or Ethernet) that allows the library to communicate with a drive or control port. The encryption error may be received by the library over one of these interfaces.

In one embodiment, a send diagnostic command (e.g., a SCSI Send Diagnostic command) may be the trigger event (e.g., the host detected trigger event). For example, a host application or device driver may issue a SCSI Send Diagnostic command to a library as part of an error recovery procedure (ERP) or a wellness check of the library. The library may detect the SCSI Send Diagnostic command through one or more interfaces of the library. For example, there may be an interface (e.g., SCSI, Fibre Channel, Ethernet) that allows the library to communicate with a host computer and/or there may be an interface (e.g., serial or Ethernet) that allows the library to communicate with a drive or control port. The SCSI Send Diagnostic command may be received by the library over one of these interfaces.

In one embodiment, a direct indication from the host computer may be the trigger event (e.g., the host detected trigger event). For example, a device driver or a host application installed on the host computer may send a library command that is used as a trigger event for the library to collect a log snapshot. In this example, the command may comprise a vender unique command, a proprietary command or a supported command (e.g., SCSI Mode Select). The library may detect the indication command through one or more interfaces of the library. For example, there may be an interface (e.g., SCSI, Fibre Channel, Ethernet) that allows the library to communicate with a host computer and/or there may be an interface (e.g., serial or Ethernet) that allows the library to communicate with a drive or control port. The indication command may be received by the library over one of these interfaces.

A host detected error is an error, warning, alert, SCSI unit attention, that may be eventually reported to a host, or observed by a host, or the result of some action by a host. For example, an illegal request is both the result of some action by a host and it is reported to the host as an error. A host related triggering event is detected by the automated data storage library, either directly or indirectly. For example, a directly detected event may be an illegal request where the library receives a command from a host and determines that the command is illegal. In another example, an indirectly detected event may be a drive setting the TAFC bit where something was detected by the drive and then reported to the library through this bit in the VHF data packet. For example, a tape drive provides encryption capability for host data that is written to, or read from, the data storage drive. The data storage drive may encounter a problem with the encryption of the host data and this may be a host related triggering event. A host refers to a host computer, a host application, a host device driver, or a host operating system that communicates with, either directly or indirectly, an automated data storage library or a drive associated with an automated data storage library.

Figure 12:
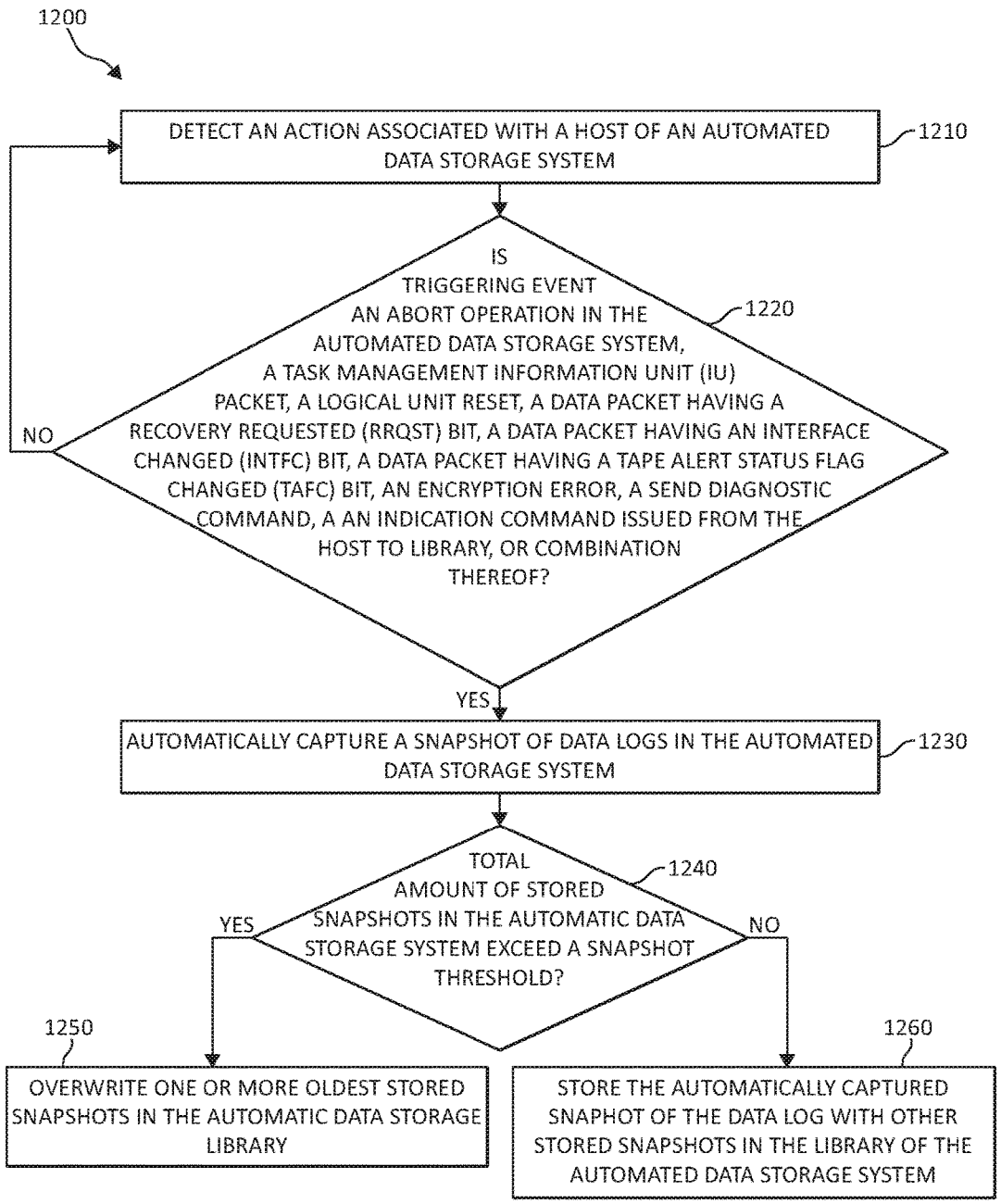
FIG. 12 is an additional flowchart diagram depicting an exemplary method for automated data storage library snapshot for host detected errors by a processor; again in which aspects of the present invention may be realized.

Turning now to FIG. 12, a method 1200 for automated data storage library snapshot for host detected errors is depicted, in which various aspects of the illustrated embodiments may be implemented. The functionality 1200 may be implemented as a method executed as instructions on a machine, where the instructions are included on at least one computer readable medium or on a non-transitory machine-readable storage medium. Starting in block 1210, an action associated with an automated data storage library (e.g., automated data storage library) may be detected. A determination operation is performed to determine if the triggering event is an abort operation, a task management information unit (IU) packet, a logical unit reset, a data packet having a recovery requested (RRQST) bit, a data packet having an interface changed (INTFC) bit, a data packet having a tape alert status flag changed (TAFC) bit, an encryption error, a send diagnostic command, an indication command issued from the host to library, and/or a combination thereof, as in block 1220. If no, the automated data storage library may resume normal operation and/or return to block 1210. If yes at block 1220, a snapshot of one or more logs in the automated data storage library may be captured (or generated) upon detection of a host detection triggering event, as in block 1230. A determination operation may be performed to determine whether a total amount of stored snapshots in the automated data storage library exceeds a snapshot threshold, as in block 1240. If yes at block 1240, one or more oldest stored snapshots (as compared to other stored snapshots) in the automated data storage library may be overwritten with captured snapshot (e.g., most recent snapshot), as in block 1250. If no at block 1240, the captured snapshot of the one or more logs may be stored with other stored snapshots by the automated data storage library (without overwriting any other stored snapshots), as in block 1260.

The mechanisms of the illustrated embodiments provide a solution to maintain the library storage from being overwhelmed with a large number of snapshot logs by limiting a number of snapshots that are stored at any point in time such that a selected snapshot (e.g., the oldest snapshot) is overwritten by a new one. For example, a snapshot threshold defining a maximum number of snapshots that may be stored may be employed to determine whether the oldest snapshot is to be overwritten. Alternatively, other algorithms could be used to determine which snapshot to overwrite such as one that is evaluated to be less relevant or less critical than others.

In one aspect, the logs may comprise trace information (what was the library doing), diagnostic information (what kinds of error or problems were encountered), statistical information (what was the performance or usage of various library components), configuration information (settings and preferences of the library), backup information (a backup of one or more components of the library state, settings, or configuration), database information (the contents of one or more library databases), and/or a combination thereof.

In one aspect, the triggers events, as described herein, may include opening of one or more doors (e.g., a front door, a back door, a side door, top door, bottom door, etc.) to the library, a drive or library reset (e.g., initiated through a user interface of the library), a component action (e.g., removal, extraction, replacement, and/or insertion of a library component), a reset of all or at least a portion of the automated data storage library, a service action, an illegal request, an abort operation, a task management information unit (IU) packet, a logical unit reset, a data packet having a recovery requested (RRQST) bit, a data packet having an interface changed (INTFC) bit, a data packet having a tape alert status flag changed (TAFC) bit, an encryption error, a send diagnostic command, an indication command issued from the host to library, and/or a combination thereof. Also, as described herein, the logs may be snapshots related to removal, extraction, replacement, and/or insertion of a library component (e.g., a drive, a power supply, a library controller card, a robot accessor, any other replaceable component in the library), a reset of all or at least a portion of the automated data storage library, a removal, replacement, reset of a drive, a power supply, a library controller card, a robot accessor, a component of the library, a service action, an illegal request, an abort operation, a task management information unit (IU) packet, a logical unit reset, a data packet having a recovery requested (RRQST) bit, a data packet having an interface changed (INTFC) bit, a data packet having a tape alert status flag changed (TAFC) bit, an encryption error, a send diagnostic command, an indication command issued from the host to library, and/or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM, EEPROM or Flash memory), a static random access memory (SRAM), dynamic random access memory (DRAM), a portable compact disc read-only memory (CD-ROM), a digital versatile disk (DVD), a memory stick, a floppy disk, a CompactFlash (CF) card, a Secure Digital (SD) card, a miniSD card, a microSD card, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one aspect, a computer may include a library controller. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to one or more processors of a general purpose computer, special purpose computer, or other programmable data processing apparatus to produce a machine, such that the instructions, which execute via the one or more processors of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions. In addition, some blocks may be omitted without deviating from the scope of the invention.

The invention claimed is:

1. A method, by one or more processors, for automatic log collection of an automated data storage library, comprising:
   detecting an occurrence of a triggering event associated with the automated data storage library, wherein the triggering event includes at least detecting an opening of one or more doors of the automated data storage library;
   capturing a snapshot of one or more logs associated with the automated data storage library upon detection of the triggering event, the one or more logs including at least error logs, service-related logs, and accessor logs at an appliance-level of the automated data storage library, and logs associated with data storage media stored within the automated data storage library; and
   storing the snapshot of the one or more logs by the automated data storage library.

2. The method of claim 1, further including detecting the triggering event using firmware of the automated data storage library.

3. The method of claim 1, further including overwriting a selected stored snapshot in the automated data storage library with the snapshot.

4. The method of claim 1, further including:
   detecting in the automated data storage library a total amount of stored snapshots exceeds a threshold; and
   overwriting a selected stored snapshot in the automated data storage library with the snapshot upon the total amount of store snapshots exceeding the threshold.

5. The method of claim 1, further including determining that the triggering event falls within a snapshot filter and wherein the capturing or storing elements are bypassed as a result.

6. The method of claim 1, wherein the triggering event includes opening one or more panels of the automated data storage library.

7. The method of claim 1, wherein the one or more doors includes one or more from a set of a front door, a back door, a side door, a top door, and a bottom door.

8. A system for automatic log collection of an automated data storage library, comprising:
   one or more processors with executable instructions that when executed cause the system to:
      detect an occurrence of a triggering event associated with the automated data storage library, wherein the triggering event includes at least detecting an opening of one or more doors of the automated data storage library;
      capture a snapshot of one or more logs associated with the automated data storage library upon detection of the triggering event, the one or more logs including at least error logs, service-related logs, and accessor logs at an appliance-level of the automated data storage library, and logs associated with data storage media stored within the automated data storage library; and
      store the snapshot of the one or more logs by the automated data storage library.

9. The system of claim 8, wherein the executable instructions further detect the triggering event using firmware of the automated data storage library.

10. The system of claim 8, wherein the executable instructions further overwrite a selected stored snapshot in the automated data storage library with the snapshot.

11. The system of claim 8, wherein the executable instructions further:
   detect in the automated data storage library a total amount of stored snapshots exceeds a threshold; and
   overwrite a selected stored snapshot in the automated data storage library with the snapshot upon the total amount of stored snapshots exceeding the threshold.

12. The system of claim 11, wherein the executable instructions further determine that the triggering event falls within a snapshot filter and wherein the capturing and/or storing elements are bypassed as a result.

13. The system of claim 8, wherein the triggering event includes opening one or more panels of the automated data storage library.

14. The system of claim 8, wherein the one or more doors includes one or more from a set of a front door, a back door, a side door, a top door, and bottom door.

15. A computer program product for, by one or more processors, automatic log collection of an automated data storage library, the computer program product comprising a non-transitory computer-readable storage medium having computer-readable program code portions stored therein, the computer-readable program code portions comprising:
   an executable portion that detects an occurrence of a triggering event associated with the automated data storage library, wherein the triggering event includes at least detecting an opening of one or more doors of the automated data storage library;
   an executable portion that captures a snapshot of one or more logs associated with the automated data storage library upon detection of the triggering event, the one or more logs including at least error logs, service-related logs, and accessor logs at an appliance-level of the automated data storage library, and logs associated with data storage media stored within the automated data storage library; and
   an executable portion that stores the snapshot of the one or more logs by the automated data storage library.

16. The computer program product of claim 15, further including an executable portion that detects the triggering event using firmware of the automated data storage library.

17. The computer program product of claim 15, further including an executable portion that overwrites a selected stored snapshot in the automated data storage library with the snapshot.

18. The computer program product of claim 15, further including an executable portion that:
   detects in the automated data storage library a total amount of stored snapshots exceeds a threshold;
   overwrites a selected stored snapshot in the automated data storage library with the snapshot upon the total amount of stored snapshots exceeding the threshold; and
   determines that the triggering event falls within a snapshot filter and wherein the capturing and/or storing elements are bypassed as a result.

19. The computer program product of claim 15, wherein the triggering event includes opening one or more panels of the automated data storage library.

20. The computer program product of claim 15, wherein the one or more doors includes one or more from a set of a front door, a back door, a side door, a top door, and a bottom door.

* * * * *